(12) United States Patent
Wang et al.

(10) Patent No.: US 7,628,681 B2
(45) Date of Patent: Dec. 8, 2009

(54) MECHANISM FOR SUPPRESSING GRINDING-CUTTING VIBRATION

(75) Inventors: Fu-Ching Wang, Taichung (TW); Chih-Chun Cheng, Taichung (TW); Wen-Nan Cheng, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 243 days.

(21) Appl. No.: 11/778,013

(22) Filed: Jul. 13, 2007

(65) Prior Publication Data

US 2009/0016835 A1   Jan. 15, 2009

(51) Int. Cl.
*B24B 41/06* (2006.01)

(52) U.S. Cl. .................. 451/408; 451/402; 451/242; 451/142

(58) Field of Classification Search .............. 451/406, 451/407, 408, 398, 402, 242, 268, 142, 143
See application file for complete search history.

(56) References Cited

U.S. PATENT DOCUMENTS 1,790,669 A * 2/1931 Koon .......................... 451/407
2,459,068 A * 1/1949 Eastwood .................... 451/408

* cited by examiner

*Primary Examiner*—Robert Rose
(74) *Attorney, Agent, or Firm*—Banger Shia

(57) ABSTRACT

A mechanism for suppressing grinding-cutting vibration comprises a C-shaped base, a fixed support seat, a clamp device and a vibration absorber. Based on vibration absorbing principle of the vibration theory, the clamp device is connected to the movable cutting machine, so as to move along with the cutting machine during the machining operation, and the clamp force applied to clamp the workpiece is adjustable. By such arrangements, the vibration energy produced at the time of cutting the workpiece can be transferred to the vibration absorber through the clamp device, and then a part of the vibration energy will be absorbed by the vibration absorber, thus achieving the objective of reducing vibration of the cut position.

6 Claims, 10 Drawing Sheets

US 7,628,681 B2

MECHANISM FOR SUPPRESSING GRINDING-CUTTING VIBRATION

BACKGROUND OF THE INVENTION

1. Field of the Invention

The present invention relates to a grinding-cutting device, and more particularly to a mechanism for suppressing grinding-cutting vibration.

2. Description of the Prior Art

Conventionally, the workpiece always vibrates when it is machined by the cutting mechanism, so that the machining precision of the workpiece will be influenced. Recently, in order to avoid such vibration, sensors are used to measure the vibration range caused during the cutting operation, as shown in FIG. 1, the rotation speed of the principle shaft of the cutting mechanism can be adjusted by the signal feedback or can be manually adjusted, so as to achieve the objective of suppressing the vibration of the workpiece. However, if the rotation speed of the principal shaft of the cutting mechanism is frequently adjusted, the surface roughness of the workpiece and the precision of the machined workpiece cannot be assured, particularly for the grinding machine, which especially stresses the machining parameters and environment.

The clamp method of the cylindrical grinding machine is to use two support tips to support the workpiece. Due to the natural fall of the workpiece under the action of the gravity, a central support is usually used to support the workpiece. As shown in FIGS. 2-3, a conventional central support 10 is a follow rest with two or three heads to clamp and position the workpiece. The follow rest can be adjusted, when the follow rest is adjusted to the optimal support position relative to the workpiece, the follow rest will be locked. At this moment, the follow rest contacts the workpiece in rigidity-to-rigidity manner. Due to the imperfect round of the workpiece, the workpiece itself will rotate during the grinding operation. When the workpiece rotates, it will produce sliding friction relative to the follow rest, so that the follow rest cannot restrict the workpiece completely, and the workpiece will vibrate, thus causing the poor quality of the machined workpiece.

The present invention has arisen to mitigate and/or obviate the afore-described disadvantages.

SUMMARY OF THE INVENTION

The primary objective of the present invention is to provide a mechanism for suppressing grinding-cutting vibration which can adopt a clamp device together with a vibration absorber, so as to move along with the cut position of the cutting tool for absorbing the vibration energy caused during cutting operation, thus reducing the vibration of the cut position.

The advantage of the mechanism for suppressing grinding-cutting vibration of the present invention is that the K value of the vibration absorber can be adjusted according to the workpiece and machining condition for maximizing the vibration-absorbing effect along with the movement of the cut position.

Hence, a mechanism for suppressing grinding-cutting vibration in accordance with the present invention comprises:

a C-shaped seat with an opening facing a cutting tool being formed with a groove and a thread hole, the groove aligned with the thread hole;

a fixed support seat being fixed in the groove of the C-shaped seat and being formed with a through hole;

a clamp device being slidably installed on the through hole of the fixed support seat for abutting against the workpiece; and a vibration absorber being screwed in the thread hole of the C-shaped seat and contacting with the clamp device.

Thereby, the vibration caused during machining the workpiece can be transferred to the vibration absorber through the clamp device.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 4-8, a mechanism for suppressing grinding-cutting vibration in accordance with a preferred embodiment of the present invention comprises a C-shaped seat 1, a fixed support seat 2, a clamp device 3 and a vibration absorber 4.

Figure 8:
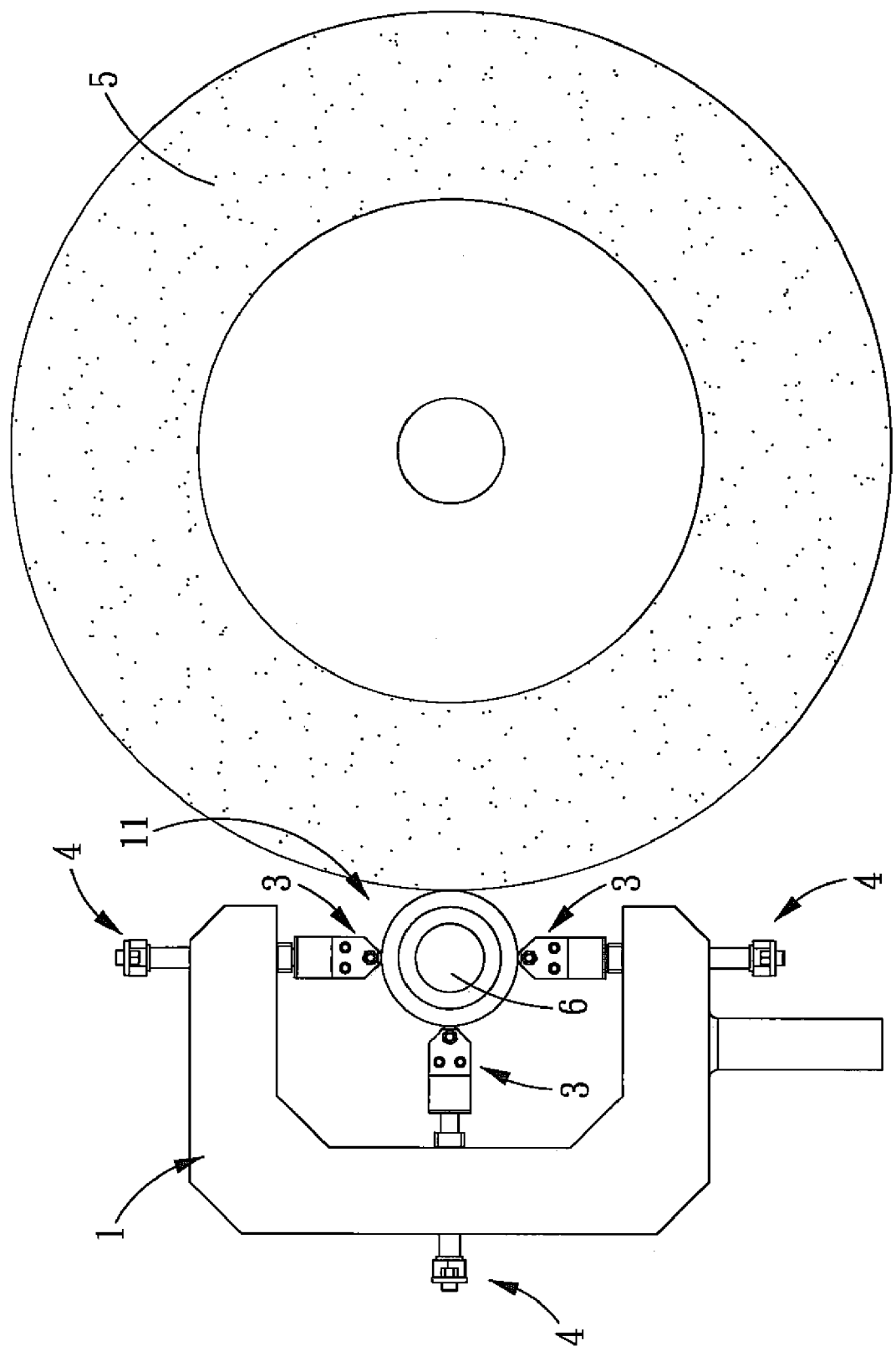
FIG. 8 is a side view of showing the positional relationship of a cutting tool and a workpiece in accordance with the present invention.

The C-shaped seat 1 is formed with a groove 12 and a thread hole 13 that are aligned with each other, and an opening 11 of the C-shaped seat 1 faces a cutting tool 5 (a grinding wheel is taken as an example in this embodiment, as shown in FIG. 8).

The fixed support seat 2 is fixed in the groove 12 of the C-shaped seat 1 and disposed with a through hole 21.

Figure 9:
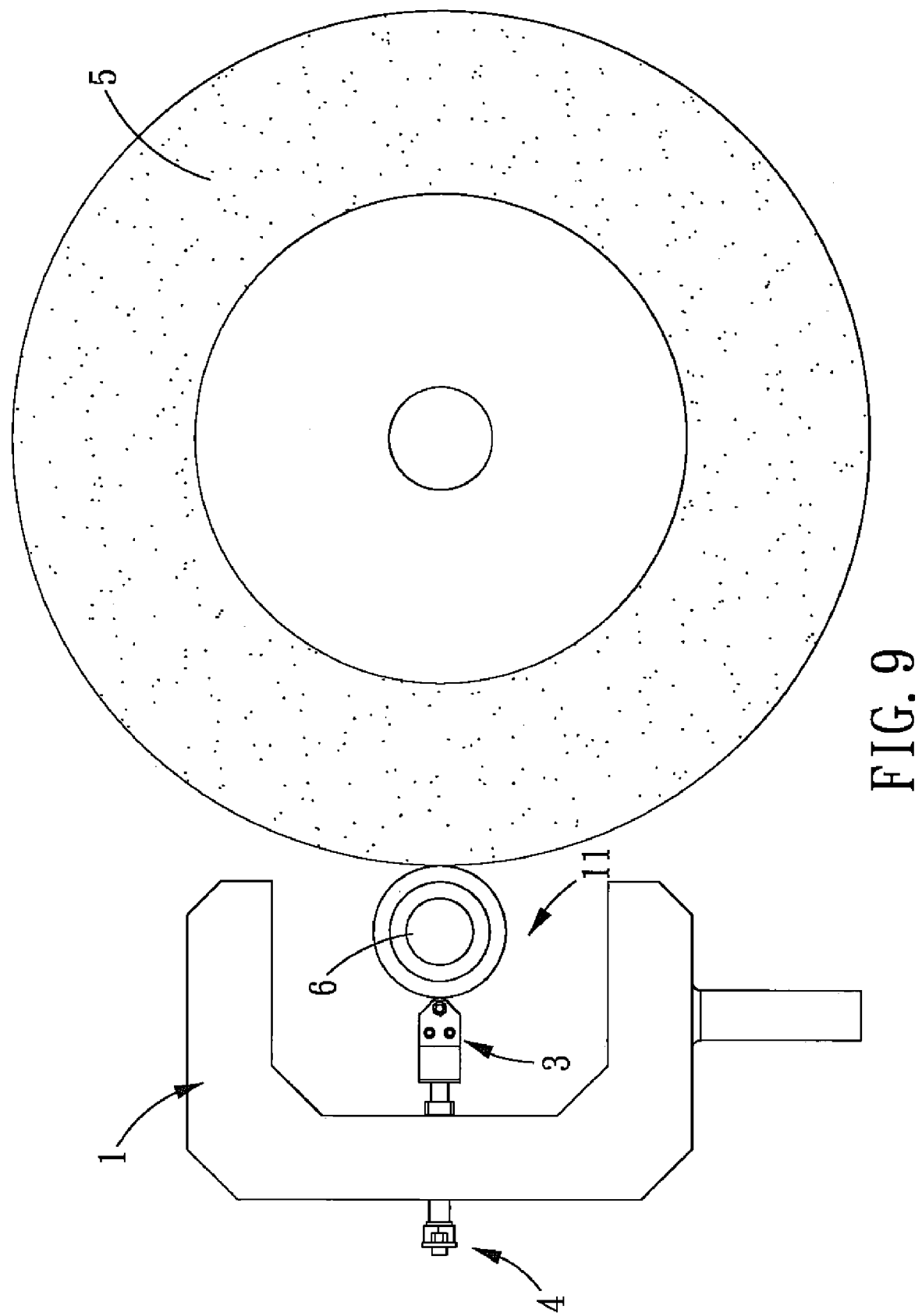
FIG. 9 is a side operational view of showing that the mechanism for suppressing grinding-cutting vibration only adopts one clamp device and one vibration absorber in accordance with the present invention.
Figure 10:
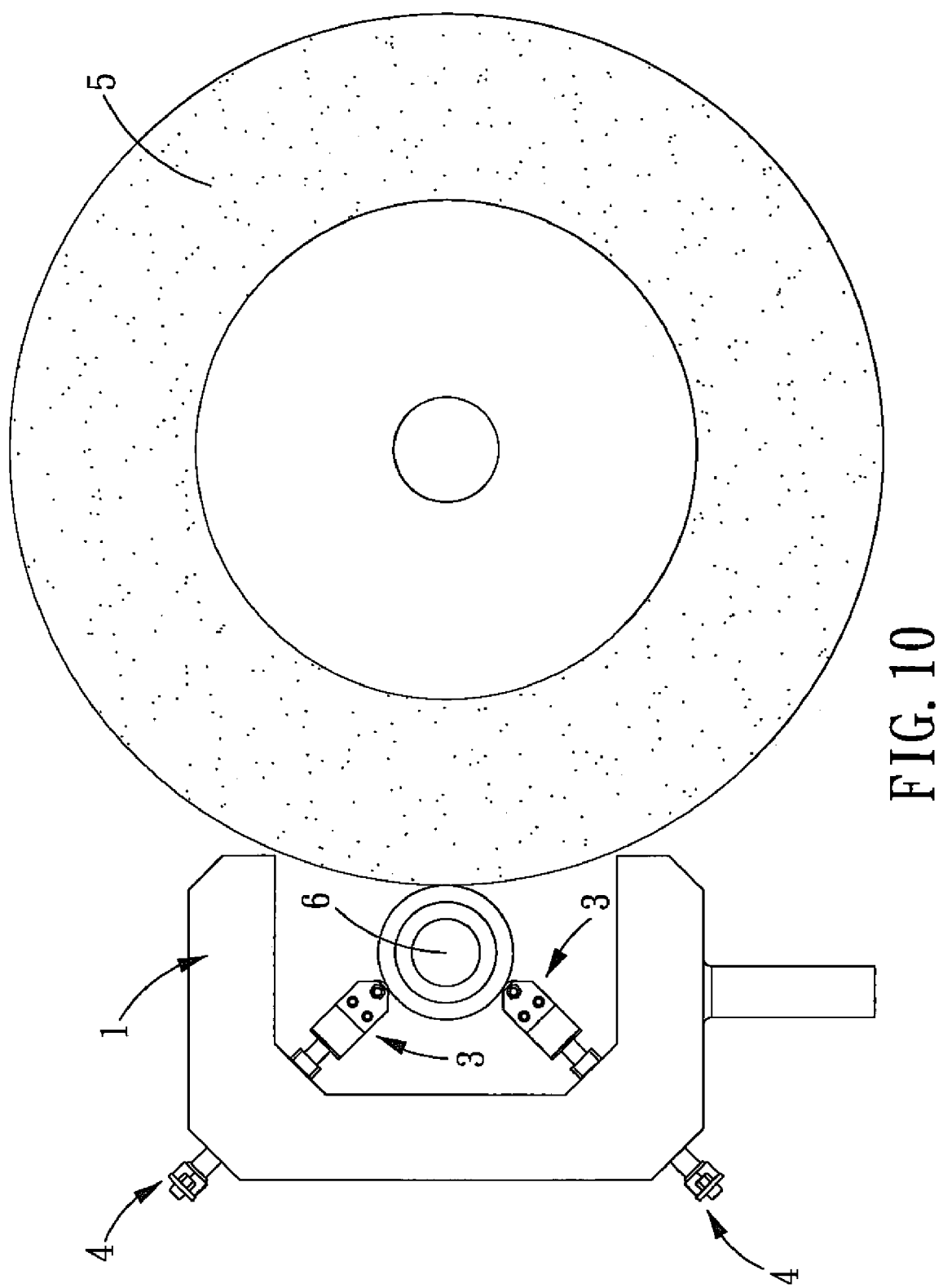
FIG. 10 is a side operational view of showing that the mechanism for suppressing grinding-cutting vibration only adopts two clamp devices and two vibration absorbers in accordance with the present invention.

The clamp device 3 is slidably mounted to the through hole 21 of the fixed support seat 2 for pressing against the workpiece 6 to be processed (as shown in FIG. 8). As shown in this embodiment, the quantity of the clamp device 3 can be only one (as shown in FIG. 9), two (as shown in FIG. 10), three or more, as long as the workpiece can be clamped stably. The clamp device 3 includes a body 31, an elastic assembly 32 and an intermediate rod 33. One side of the body 31 is formed with a groove 311, and the other side of the body 31 is pivotally coupled with two rollers 312 adjacent to both ends of the body 31, and the respective rollers 312 are used to contact the workpiece 6. The elastic assembly 32 is disposed in the groove 311 of the body 31 for offering the elastic return force. One end 331 of the intermediate rod 33 is also disposed in the groove 311 of the body 31 following the elastic assembly 32, because the end 331 includes a bigger diameter head portion, it will be restricted in the groove 311 of the body 31 after being inserted therein. The other end 332 of the intermediate rod 33 is slidably disposed in the through hole 21 of the fixed support seat 2.

The vibration absorber 4 is screwed in the thread hole 13 of the C-shaped seat 1 and contacts the clamp device 3. As shown in this embodiment, the quantity of the vibration absorbers 4 can be one (as shown in FIG. 9), two (as shown in FIG. 10), three or more, as long as a part of vibration can be eliminated. The vibration absorber 4 includes an adjustment screw 41, an oscillator plate 42 and two balance weights 43. The adjustment screw 41 is screwed in the thread hole 13 of the C-shaped seat 1, and one end 411 of the adjustment screw 41 contacts the intermediate rod 33. The oscillator plate 42 is fixed on the other end 412 of the adjustment screw 41. The two balance weights 43 are located adjacent to both ends of the oscillator plate 42. As shown in this embodiment, each of the two balance weights 43 includes a bolt 431 and a nut 432.

The aforementioned is the summary of the positional and structural relationship of the respective components of the preferred embodiment in accordance with the present invention.

Figure 1:
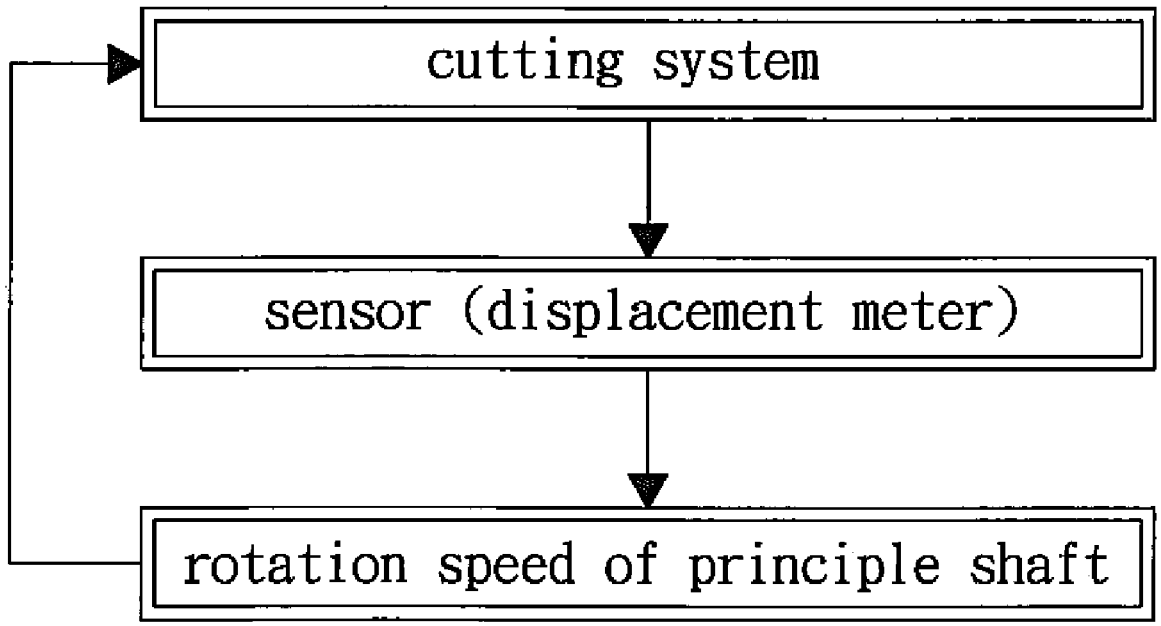
FIG. 1 is a flow chart of showing that a signal feedback is used to adjust the rotation speed of the principal shaft of a cutting mechanism.
Figure 2:
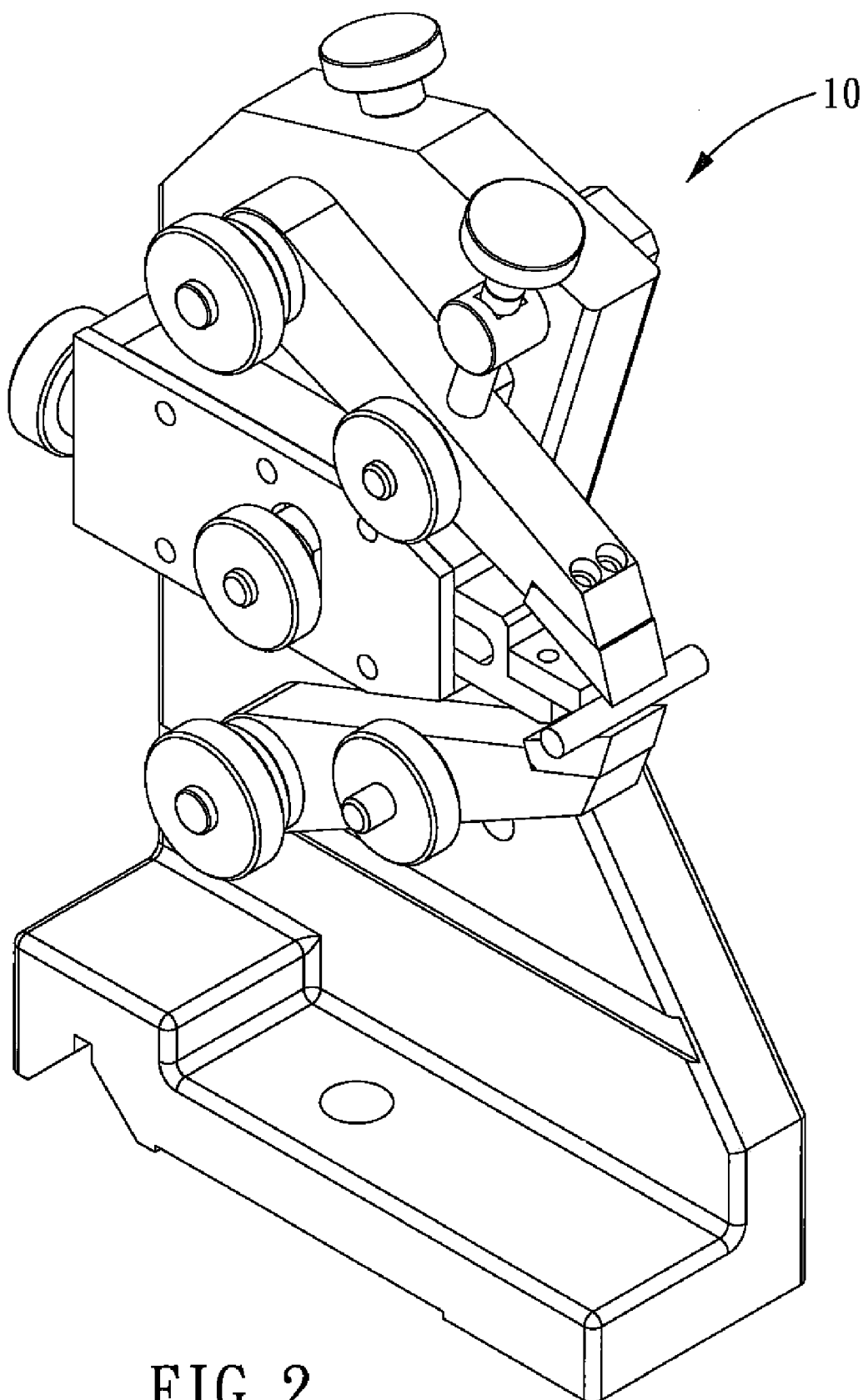
FIG. 2 is a perspective view of showing a conventional cylindrical grinding machine with a central support.
Figure 3:
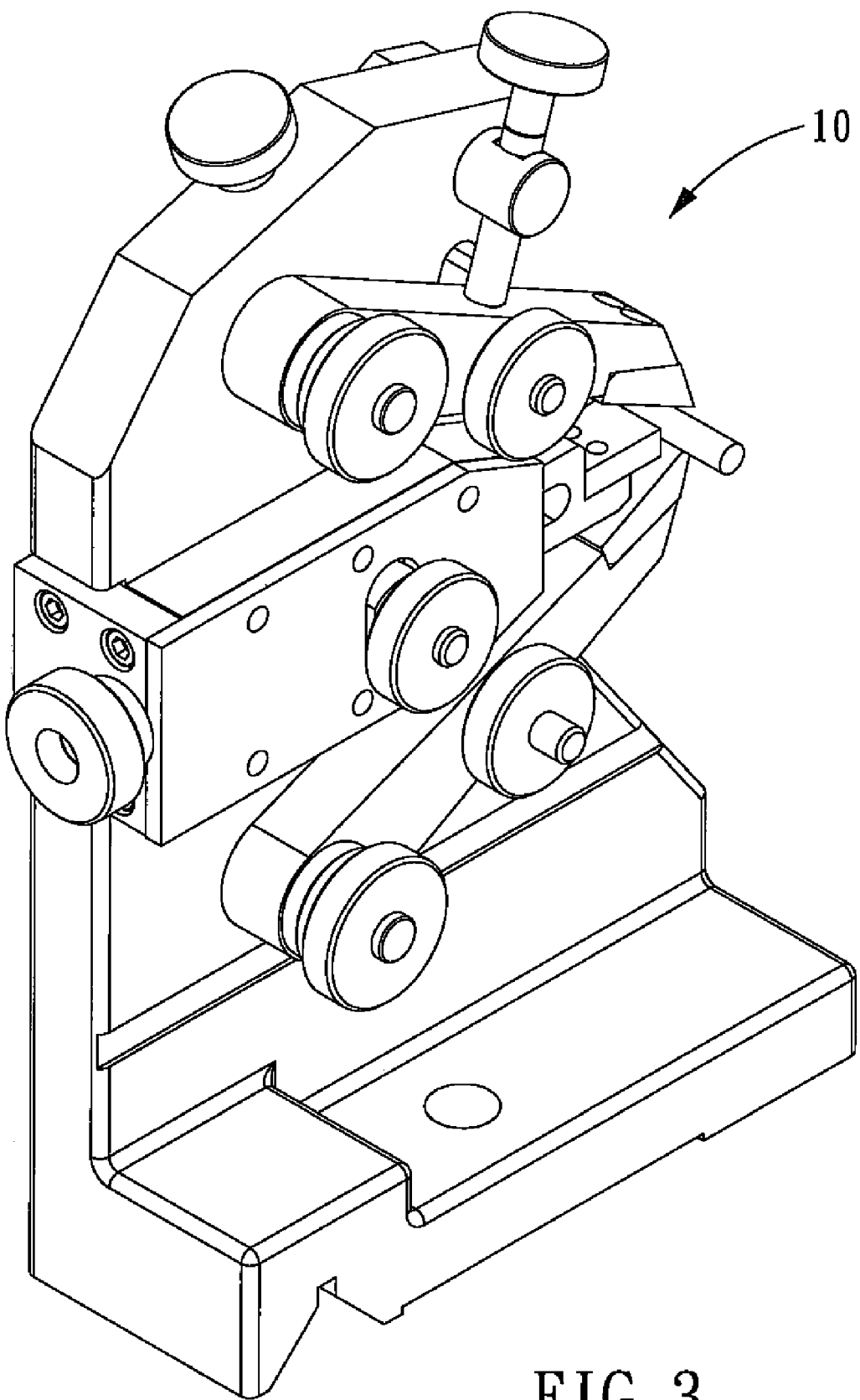
FIG. 3 is a perspective view of showing another angle of the conventional cylindrical grinding machine with a central support.
Figure 4:
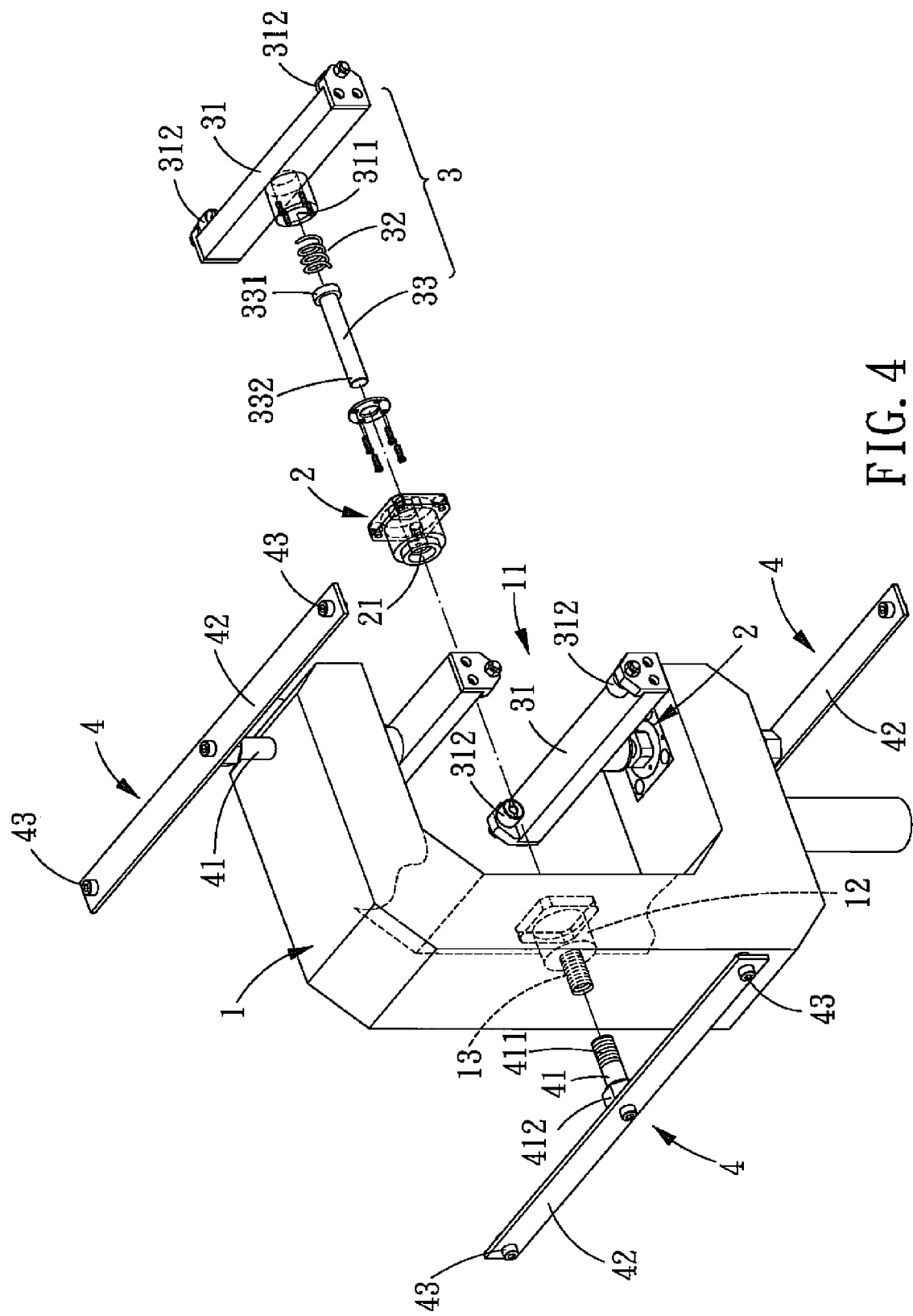
FIG. 4 is an exploded view of a mechanism for suppressing grinding-cutting vibration in accordance with the present invention.
Figure 5:
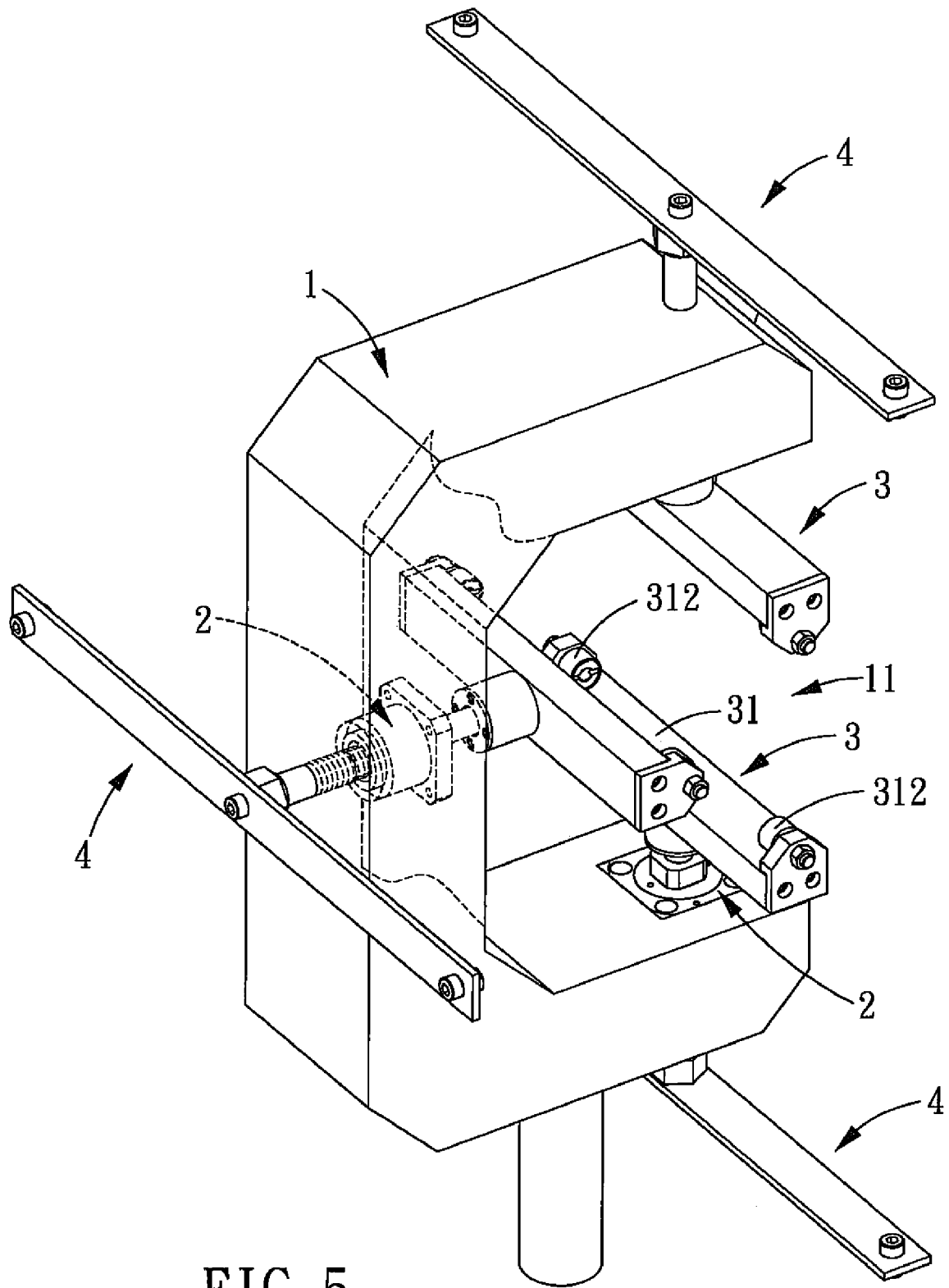
FIG. 5 is an exploded view of a mechanism for suppressing grinding-cutting vibration in accordance with the present invention.
Figure 6:
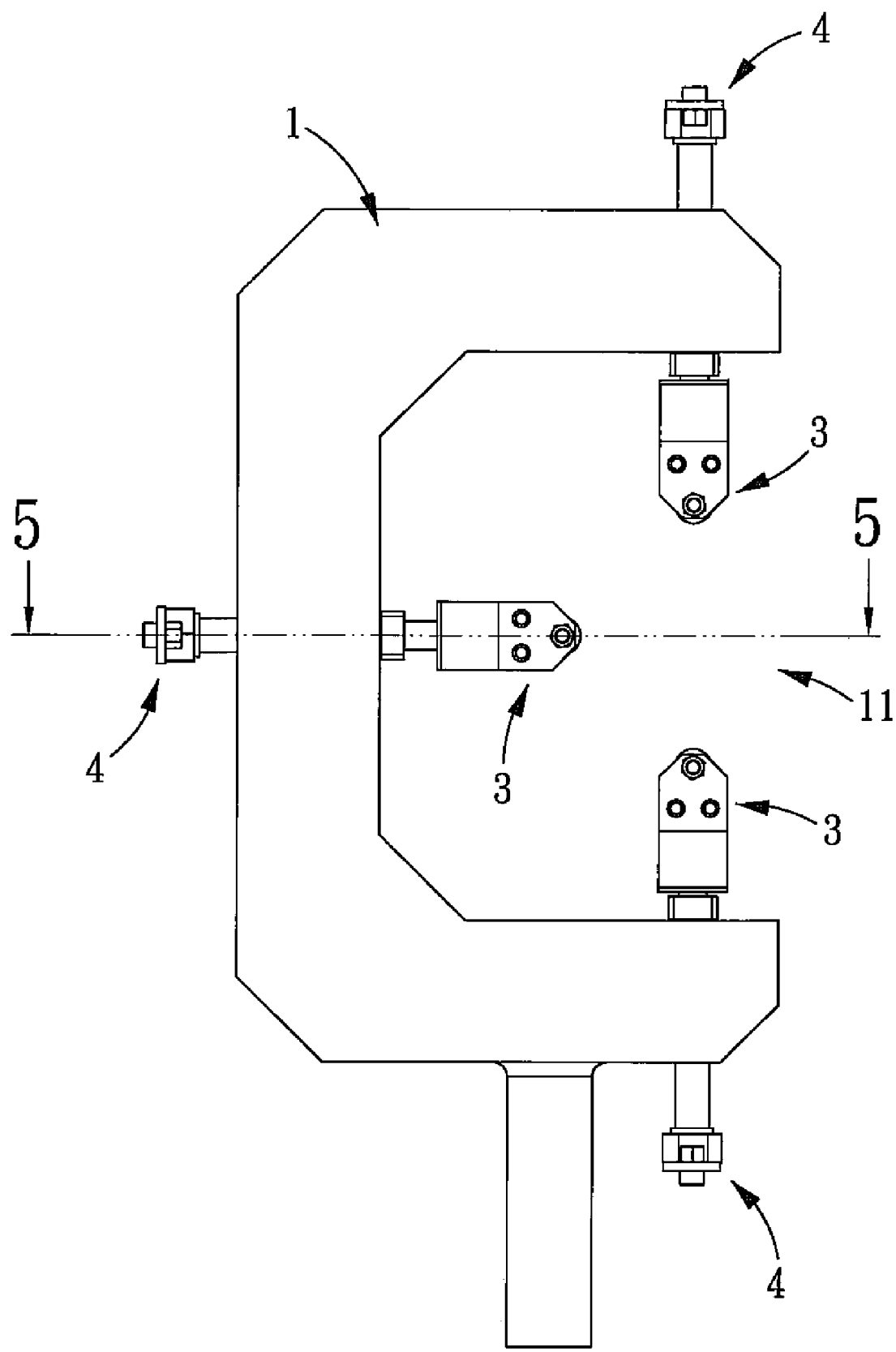
FIG. 6 is a perspective view of the mechanism for suppressing grinding-cutting vibration in accordance with the present invention.
Figure 7:
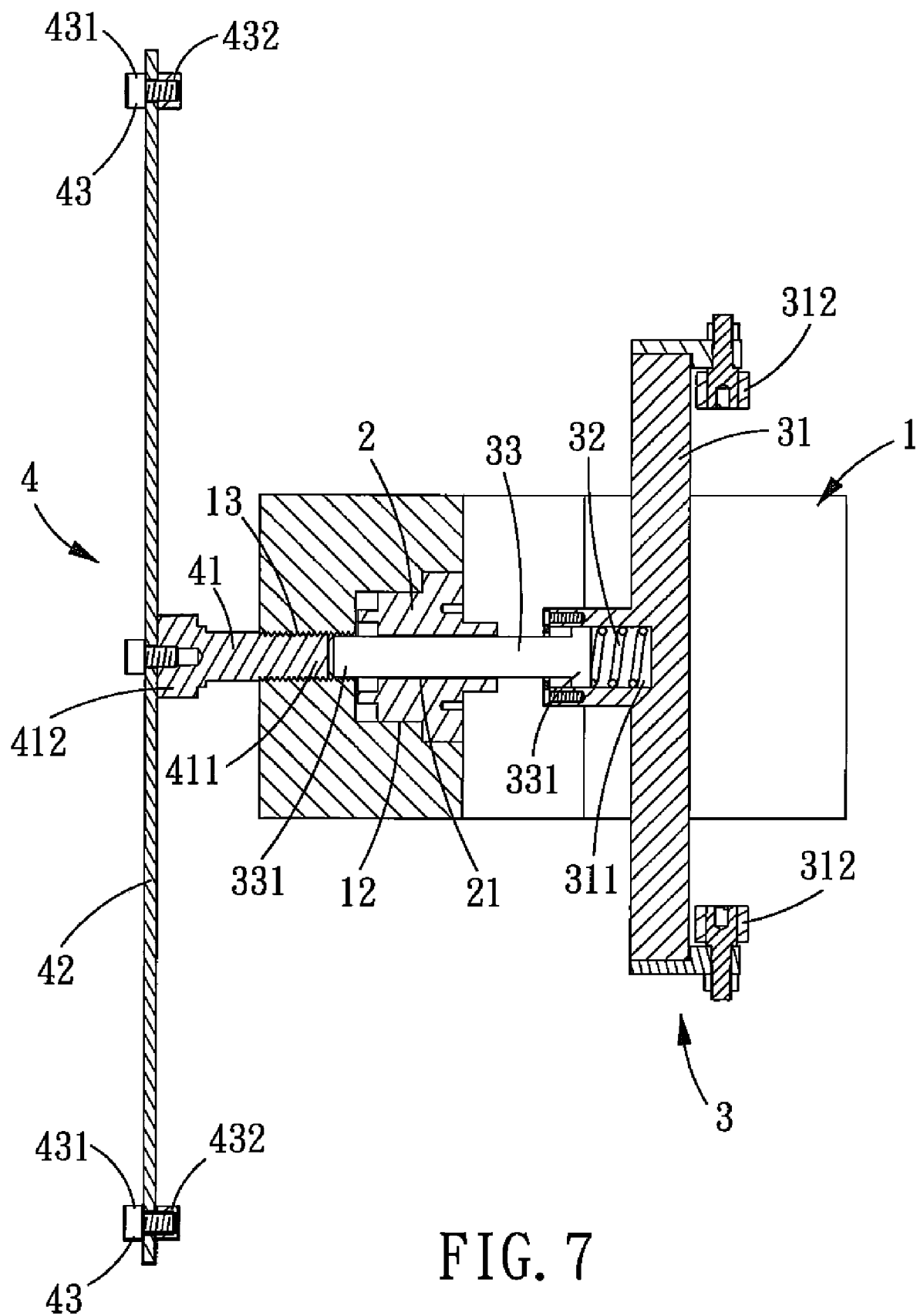
FIG. 7 is a cross-sectional view of the mechanism for suppressing grinding-cutting vibration along the line 5-5 of FIG. 4 in accordance with the present invention.

For a better understanding of the present invention, its operation and function, reference should be made to FIGS. 5-7.

Firstly, both ends of the workpiece 6 are supported by the support tips of the cutting tool 5, and then the respective clamp devices 3 slightly supports the workpiece 6 in three directions. The adjustment screw 41 can be rotated to move forwards, so as to push the intermediate rod 33 to move forwards to press the elastic assembly 32, thus adjusting the force (i.e. the elasticity coefficient of the elastic assembly at the fixed end during the grinding cutting operation) of the respective clamp device 3 supporting the workpiece 6. When the grinding wheel of the cutting tool 511 begins to grind the workpiece 6, if vibration occurs, the elastic assembly 32 will absorb the vibration energy, the intermediate rod 33 and the adjustment screw 41 respectively, and then will be released on the respective oscillator plates 42.

To summarize, the mechanism for suppressing grinding-cutting vibration of the present invention can adopt at least one clamp device together with at least one vibration absorber that can move along with the cut position of the cutting tool, so as to absorb the vibration energy caused during the cutting operation, thus reducing the vibration of the cutting position.

While we have shown and described various embodiments in accordance with the present invention, it is clear to those skilled in the art that further embodiments may be made without departing from the scope of the present invention.

What is claimed is:

1. A mechanism for suppressing grinding-cutting vibration comprising a C-shaped seat, a fixed support seat, a clamp device and a vibration absorber, wherein:
    the C-shaped seat is opened towards a cutting machine and formed with a groove and a thread hole that are aligned with each other;
    the fixed support seat is fixed in the groove of the C-shaped seat and formed with a through hole;
    the clamp device is slidably disposed in the through hole of the fixed support seat for pressing against a workpiece;
    the vibration absorber is screwed to the thread hole of the C-shaped seat and just touches the clamp device, by such arrangements, vibration caused during machining process is transferred through the clamp device to the vibration absorber;
    wherein the clamp device includes:
    a body formed with groove at one side thereof, and pivotally coupled with two rollers at the other side adjacent to both ends thereof, and the rollers serving to contact the workpiece;
    an elastic assembly installed in the groove of the body;
    an intermediate rod with one end installed in the groove of the body following the elastic assembly and restricted in the groove of the body and with the other end installed in the through hole of the fixed support seat.

2. The mechanism for suppressing grinding-cutting vibration as claimed in claim 1, wherein there are two clamp devices and two vibration absorbers.

3. The mechanism for suppressing grinding-cutting vibration as claimed in claim 1, wherein there are three clamp devices and three vibration absorbers.

4. The mechanism for suppressing grinding-cutting vibration as claimed in claim 1, wherein the vibration absorber includes:
    an adjustment screw screwed in the thread hole of the C-shaped seat, one end of the adjustment screw contacting the intermediate rod;
    an oscillator plate fixed on the other end of the adjustment screw.

5. The mechanism for suppressing grinding-cutting vibration as claimed in claim 4, wherein a balance weight is disposed adjacent to each end of the oscillator plate.

6. The mechanism for suppressing grinding-cutting vibration as claimed in claim 5, wherein each balance weight includes a bolt and a nut.

* * * * *